United States Patent
Zhang et al.

(10) Patent No.: US 11,277,088 B1
(45) Date of Patent: Mar. 15, 2022

(54) HIGH FREQUENCY INJECTION TRANSITION DISTURBANCE ELIMINATION FOR A SALIENT POLE ELECTRIC MACHINE

(71) Applicant: Rockwell Automation Technologies, Inc., Mayfield Heights, OH (US)

(72) Inventors: Zhendong Zhang, Mequon, WI (US); Jacob Lamb, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/028,982

(22) Filed: Sep. 22, 2020

(51) Int. Cl.
    *H02P 27/08*      (2006.01)
    *H02P 21/22*      (2016.01)

(52) U.S. Cl.
    CPC ............ *H02P 27/085* (2013.01); *H02P 21/22* (2016.02); *H02P 2203/11* (2013.01); *H02P 2205/05* (2013.01); *H02P 2205/07* (2013.01)

(58) Field of Classification Search
    CPC .... H02P 27/085; H02P 21/22; H02P 2205/07; H02P 2205/05; H02P 2203/11; H02P 6/183; G05B 23/0256; G05B 2219/41093; G05B 2219/42269; H02K 17/42
See application file for complete search history.

(56) References Cited

U.S. PATENT DOCUMENTS

| 6,069,467 | A | * | 5/2000 | Jansen | .................... | H02P 6/183 |
| | | | | | | 318/801 |
| 9,300,234 | B2 | * | 3/2016 | Kakihara | ................ | H02P 21/24 |
| 2014/0145654 | A1 | * | 5/2014 | Zhang | .................... | H02P 21/18 |
| | | | | | | 318/400.02 |
| 2014/0327379 | A1 | * | 11/2014 | Yang | ...................... | H02P 6/183 |
| | | | | | | 318/400.02 |
| 2014/0333244 | A1 | * | 11/2014 | Zaim | ...................... | H02P 6/185 |
| | | | | | | 318/400.04 |
| 2015/0035469 | A1 | * | 2/2015 | Rozman | .................. | H02P 6/183 |
| | | | | | | 318/652 |

FOREIGN PATENT DOCUMENTS

WO     WO-9517780 A1 * 6/1995 ............. H02P 21/13

* cited by examiner

*Primary Examiner* — Bickey Dhakal
(74) *Attorney, Agent, or Firm* — Kunzler Bean & Adamson

(57) ABSTRACT

For high frequency injection (HFI) transition disturbance elimination, a processor directs an HFI transition for a motor. The processor determines compensation pulse voltages for an HFI compensation pulse. The processor further injects a sum of the HFI compensation pulse and an HFI voltage into a current regulator voltage output signal for a compensation Pulse Width Modulation (PWM) cycle. The HFI compensation pulse settles an HFI current to a steady state.

18 Claims, 15 Drawing Sheets

HIGH FREQUENCY INJECTION TRANSITION DISTURBANCE ELIMINATION FOR A SALIENT POLE ELECTRIC MACHINE

BACKGROUND INFORMATION

The subject matter disclosed herein relates to high frequency injection transition disturbance elimination for salient pole electric machines.

BRIEF DESCRIPTION

An apparatus for high frequency injection (HFI) transition disturbance elimination is disclosed. The apparatus includes a processor and a memory storing code executable by the processor. The processor directs an HFI transition for a motor. The processor determines compensation pulse voltages for an HFI compensation pulse. The processor further injects a sum of the HFI compensation pulse and an HFI voltage into a current regulator voltage output signal for a transition Pulse Width Modulation (PWM) cycle. The HFI compensation pulse settles an HFI current to a steady state.

A method for HFI transition disturbance elimination is also disclosed. The method directs an HFI transition for a motor. The method determines compensation pulse voltages for an HFI compensation pulse. The method further injects a sum of the HFI compensation pulse and an HFI voltage into a current regulator voltage output signal for a compensation PWM cycle. The HFI compensation pulse settles an HFI current to a steady state.

A computer program product for HFI transition disturbance elimination is also disclosed. A processor directs an HFI transition for a motor. The processor determines compensation pulse voltages for an HFI compensation pulse. The processor further injects a sum of the HFI compensation pulse and an HFI voltage into a current regulator voltage output signal for a compensation PWM cycle. The HFI compensation pulse settles an HFI current to a steady state.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
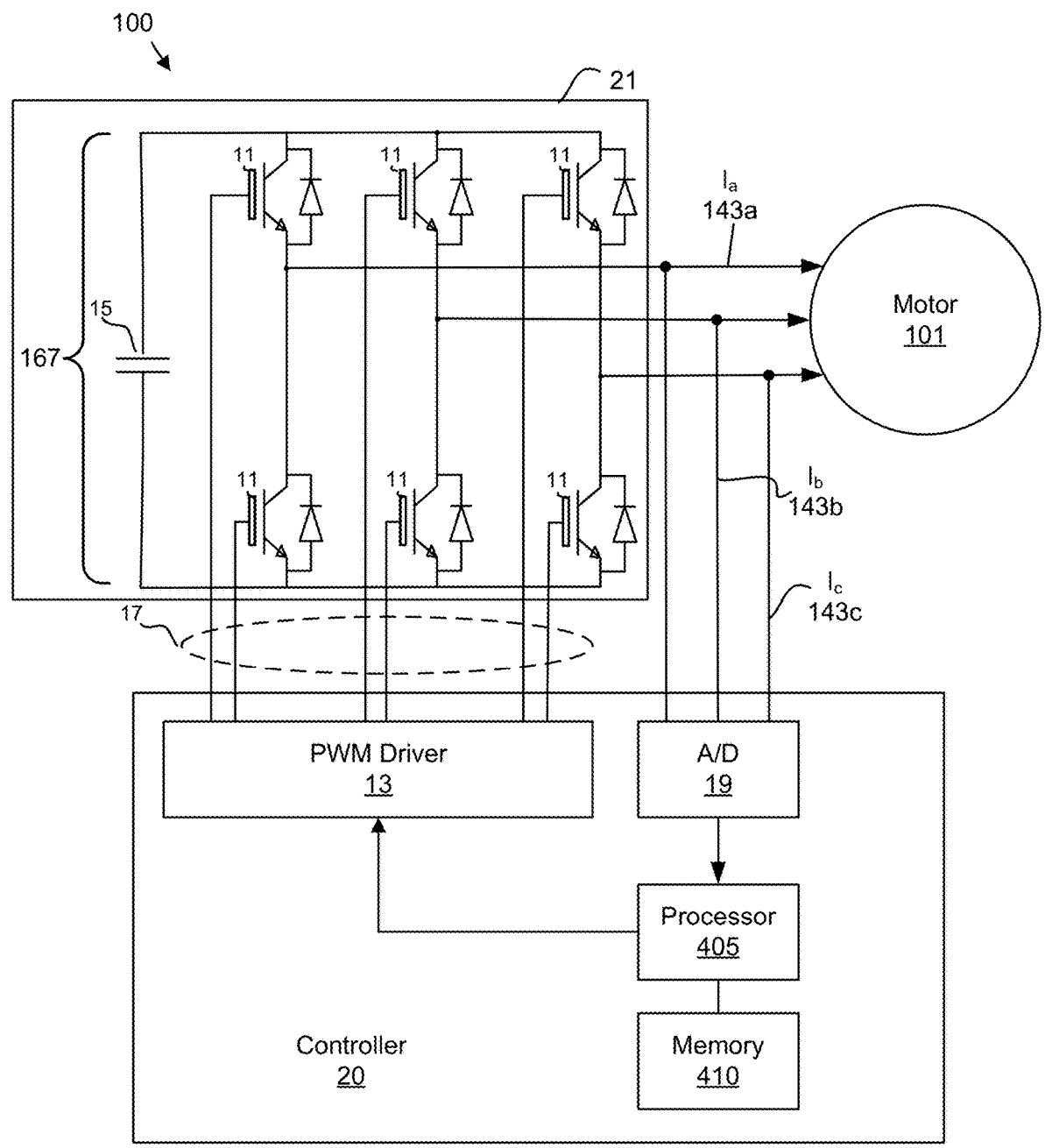
FIG. 1A is a schematic block diagram of an electric motor control system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic block diagram of an electric motor control system 100. The system 100 drives a motor 101 in response to a speed command 102. The motor 101 may be a salient motor 101. The electric motor control system 100 includes a plurality of function blocks that may be performed by hardware components, code executed by a processor, or combinations thereof.

In the depicted embodiment, a converter 21 generates a drive current $I_a$, $I_b$, $I_c$ 143a-c that drives the motor 101 from a DC bus voltage $V_{DC}$ 167. The converter 21 may be a full bridge converter 21 comprising a capacitor 15 and a plurality of insulated gate bipolar transistors (IGBT) 11. The IGBT 11 may be driven by gate signals 17 generated by a PWM driver 13. The PWM driver 13 is controlled by a processor 405 executing code stored on a memory 410. An analog to digital (A/D) converter 19 may provide the drive current 143a-c to the processor 405.

The electric motor control system 100 does not include a position sensor. Instead a High Frequency Injection (HFI) voltage is injected to enable the extraction of position information. The position information may be extracted at low speed. The position information enables control of the motor 101 without a position sensor.

Figure 1B:
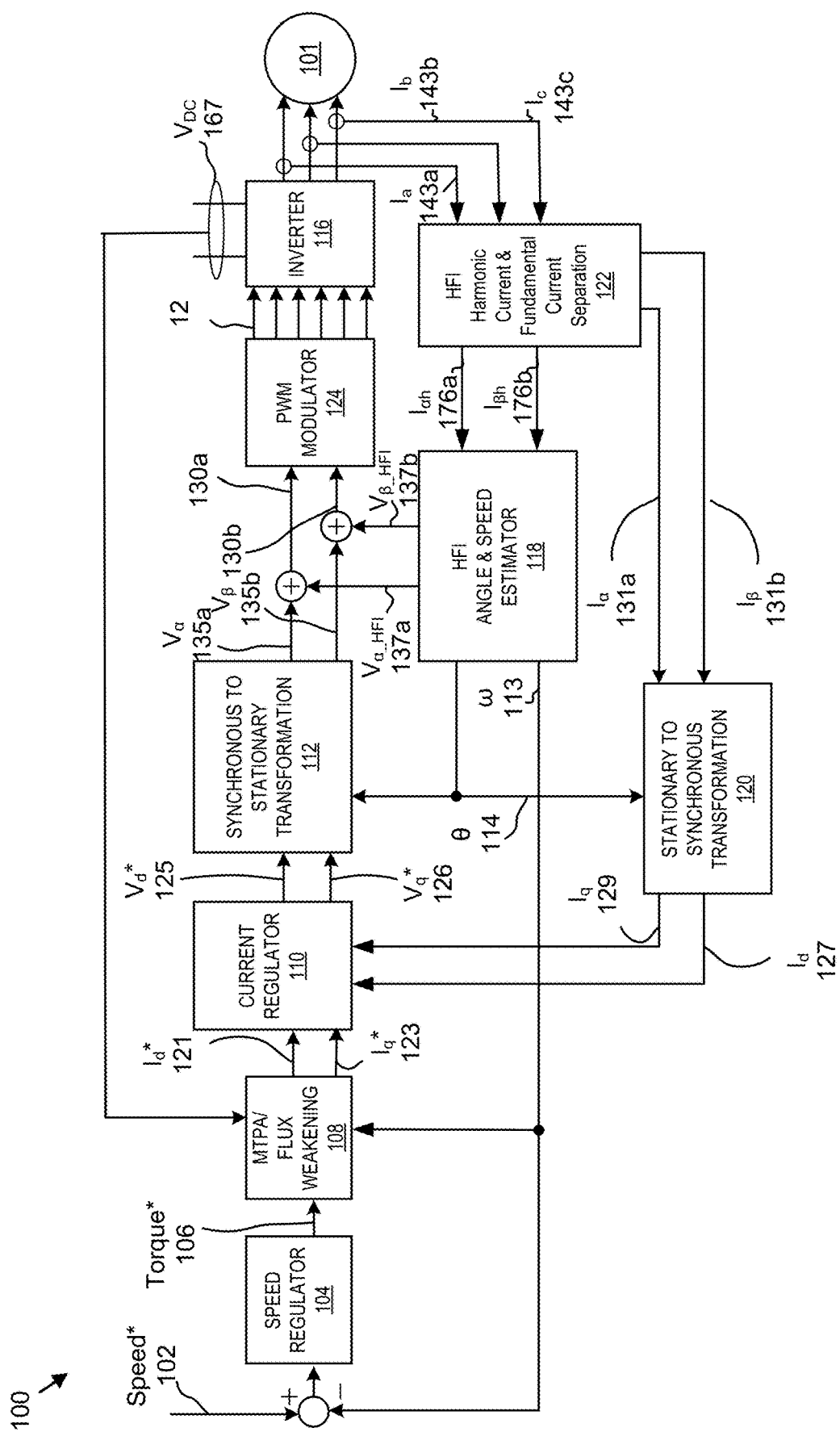
FIG. 1B is a schematic block diagram of an electric motor control system according to an embodiment.

FIG. 1B is a schematic block diagram of the motor system 100. The depicted embodiment may employ pulse voltage injection of an HFI voltage, wherein the HFI voltage is a sinusoidal voltage injection in d-q axis synchronous reference frame. Alternatively, the HFI voltage may be a sinusoidal voltage injection in alpha-beta stationary reference frame or a square wave voltage injection in d-q axis synchronous reference frame. The system 100 drives the motor 101 in response to the speed command 102. The motor system 100 includes a plurality of function blocks that may be performed by hardware components, code executed by a processor, or combinations thereof.

In the depicted embodiment, an angular velocity estimate ω 113 is subtracted from a speed command 102 and received by a speed regulator function 104. The speed regulator 104 generates a torque command 106.

A Maximum Torque Per Ampere (MTPA)/Flux Weakening function 108 receives the torque command 106 along with the angular velocity estimate ω 113 and the DC bus voltage $V_{DC}$ 167 and generates a D-axis current command $I_d^*$ 121 and a Q-axis current command $I_q^*$ 123. A current regulator 110 receives the D-axis current command $I_d^*$ 121 and the Q-axis current command $I_q^*$ 123 and generates a D-axis control output voltage $V_d^*$ 125 and a Q-axis control output voltage $V_q^*$ 126.

A synchronous to stationary transformation function 112 receives the D-axis control output voltage $V_d^*$ 125 and the Q-axis control output voltage $V_q^*$ 126 along with a motor angle estimate 114 and generates an alpha current regulator voltage output signal $V_\alpha$ 135a and a beta voltage signal $V_\beta$ 135b. The alpha current regulator voltage output signal $V_\alpha$ 135a is summed with a corresponding HFI alpha voltage $V_{\alpha\_HFI}$ 137a as a reference voltage 130a. The beta current regulator voltage output signal $V_\beta$ 135b is summed with a corresponding HFI beta voltage signal $V_{\beta HFI}$ 137b as a reference voltage 130b. The reference voltages 130a-b drive the PWM modulator 124. The addition of the HFI alpha voltage $V_{\alpha\_HFI}$ 137a and the HFI beta voltage signal $V_{\beta\_HFI}$ 137b supports the extraction of the angular velocity estimate ω 113 and the motor angle estimate θ 114.

As shown, the PWM modulator 124 controls the inverter 116 to output a command voltage 12, which drives the motor 101 with a drive current 143a-c. The drive current 143a-c is measured by current sensor of an HFI harmonic current and fundamental current separation function 122. The HFI harmonic current and fundamental current separation function 122 separates the HFI harmonic current from the fundamental frequency current of the drive current 143. The HFI harmonic current and fundamental current separation function 122 outputs in a high frequency domain HFI alpha-axis current $I_{\alpha h}$ 176a and an HFI beta-axis current $I_{\beta h}$ 176b from the drive current 143a-c. In addition, the HFI harmonic current and fundamental current separation function 122 outputs in a fundamental frequency domain of a stationary reference frame alpha-axis current $I_\alpha$ 131a and a beta-axis current $I_\beta$ 131b based on the drive current 143a-c. The HFI angle and speed estimator function 118 receives the HFI alpha-axis current $I_{\alpha h}$ 176a and the HFI beta-axis current $I_{\beta h}$ 176b and generates the angular velocity estimate ω 113, the motor angle estimate 114. It also outputs a final HFI injection alpha voltage $V_{\alpha\_HFI}$ 137a, and a final HFI injection beta voltage signal $V_{\beta\_HFI}$ 137b. The HFI angle and speed estimator function 118 is described in more detail in FIG. 1B.

A stationary to synchronous transformation function 120 generates the D-axis current $I_d$ 127 and the Q-axis current $I_q$ 129 from the alpha current $I_\alpha$ 131a and the beta current $I_\beta$ 131b.

Figure 1C:
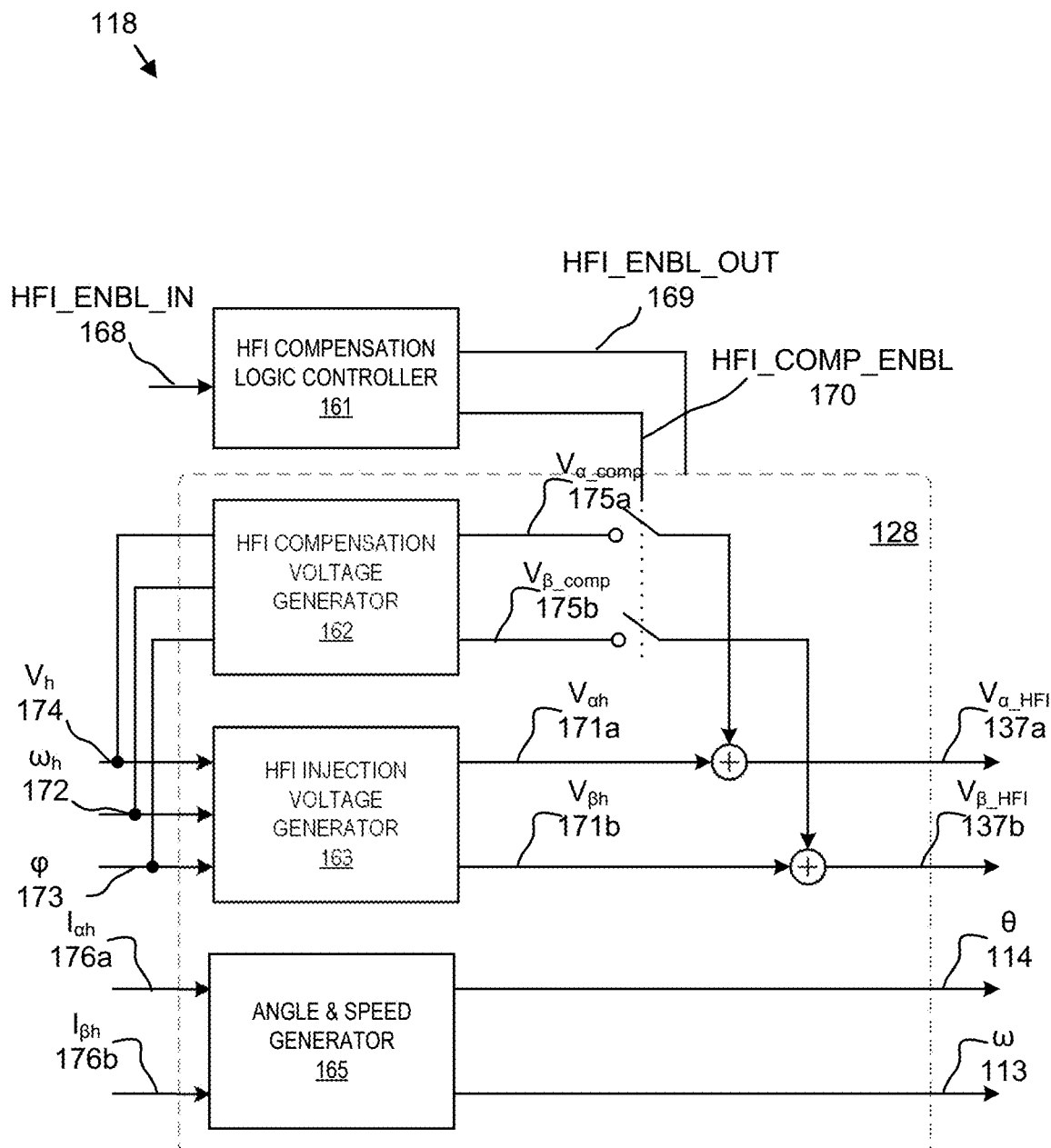
FIG. 1C is a schematic block diagram of an HFI angle and speed estimator according to an embodiment.

FIG. 1C is a schematic block diagram of the HFI angle and speed estimator 118 of FIGS. 1A-B. The high frequency injection angle and speed estimator 118 includes a plurality of function blocks that may be performed by hardware components, code executed by a processor, or combinations thereof. In the depicted embodiment, the high frequency injection angle and speed estimator 118 include an HFI compensation logic controller 161 and an HFI voltage generator and angle estimator 128.

The HFI injection frequency domain HFI alpha-axis current $I_{\alpha h}$ 176a and the HFI injection frequency domain HFI beta-axis current $I_{\beta h}$ 176b contains the rotor position information of the motor 101 and are used by the angle and speed generator function 165 to generate the angular velocity estimate ω 113 and the motor angle estimate 114.

The HFI injection voltage generator 163 receives an HFI reference voltage magnitude $V_h$ 174, an HFI voltage frequency $\omega_h$ 172 and an initial phase offset φ 173 and calculates an alpha HFI voltage 171a and a beta HFI voltage 171b. In one embodiment, the alpha HFI voltage $V_{\alpha h}$ 171a and the beta HFI voltage $V_{\beta h}$ 171b are calculated using Equation 1, wherein t is time.

$$\begin{bmatrix} V_{\alpha h} \\ V_{\beta h} \end{bmatrix} = V_h \begin{bmatrix} \cos(\omega_h t + \varphi) \\ \sin(\omega_h t + \varphi) \end{bmatrix} \quad \text{Equation 1}$$

The Salient Pole Machine High Frequency Domain Voltage Equation can be written as shown in Equation 2:

$$\begin{bmatrix} V_{\alpha h} \\ V_{\beta h} \end{bmatrix} = \begin{bmatrix} L_0 + L_1 \cos 2\theta & L_1 \sin 2\theta \\ L_1 \sin 2\theta & L_0 - L_1 \cos 2\theta \end{bmatrix} \frac{d}{dt} \begin{bmatrix} I_{\alpha h} \\ I_{\beta h} \end{bmatrix} \quad \text{Equation 2}$$

Where $$L_0 = \frac{L_d + L_q}{2}, L_1 = \frac{L_d - L_q}{2},$$

$L_d$ is me machine d-axis inductance, $L_q$ is the machine q-axis inductance. θ is the space angle between the d-axis (north pole of permanent magnet) and phase A winding.

Using Equation 1 into Equation 2, and the high frequency current is deducted as, $$\begin{bmatrix} I_{\alpha h} \\ I_{\beta h} \end{bmatrix} = \begin{bmatrix} \frac{V_h}{\omega_h(L_0^2 - L_1^2)}\{(L_0 - L_1 \cos 2\theta) \cdot \\ \sin(\omega_h t + \varphi) + L_1 \sin 2\theta \cdot \cos(\omega_h t + \varphi)\} \\ \frac{V_h}{\omega_h(L_0^2 - L_1^2)}\{-(L_0 - L_1 \cos 2\theta) \cdot \\ \sin(\omega_h t + \varphi) + L_1 \sin 2\theta \cdot \cos(\omega_h t + \varphi)\} \end{bmatrix} \quad \text{Equation 3}$$

Here, only the HFI transition from off to on is calculated as an example. For the case when HFI transition from on to off, the similar equation can be deducted.

When HFI off to on transition occurs, t=0, the above equation is simplified as, $$\begin{bmatrix} I_{\alpha h0} \\ I_{\beta h0} \end{bmatrix} = \begin{bmatrix} \frac{V_h}{\omega_h(L_0^2 - L_1^2)}\{(L_0 - L_1 \cos 2\theta_0) \cdot \sin\varphi + L_1 \sin 2\theta_0 \cdot \cos\varphi\} \\ \frac{V_h}{\omega_h(L_0^2 - L_1^2)}\{-(L_0 + L_1 \cos 2\theta_0) \cdot \cos\varphi - L_1 \sin 2\theta_0 \cdot \sin\varphi\} \end{bmatrix} \quad \text{Equation 4}$$

Where $[I_{\alpha h0}, I_{\beta h0}]$ is the initial steady state high frequency domain HFI alpha-axis current 176a and frequency domain HFI beta-axis current 176b. $\theta_0$ is the rotor position when at t=0. The initial expected steady state stator flux can be calculated as, $$\begin{bmatrix} \psi_{\alpha h0} \\ \psi_{\beta h0} \end{bmatrix} = \begin{bmatrix} (L_0 + L_1 \cos 2\theta_0)i_{\alpha h0} + (L_1 \sin 2\theta_0)i_{\beta h0} \\ (L_1 \sin 2\theta_0)i_{\alpha h0} + (L_0 - L_1 \cos 2\theta_0)i_{\beta h0} \end{bmatrix} \quad \text{Equation 5}$$

If no additional control is implemented, the high frequency domain initial flux is, $$\begin{bmatrix} \psi_{\alpha h0} \\ \psi_{\beta h0} \end{bmatrix} = \begin{bmatrix} 0 \\ 0 \end{bmatrix} \quad \text{Equation 6}$$

Thus, a compensation voltage pulse is injected to accelerate the initial flux from zero in equation 6 to its steady state in equation 5 within very short time period defined as T as shown in Equation 7, $$\begin{bmatrix} V_{\alpha h\_comp} \\ V_{\beta h\_comp} \end{bmatrix} = \begin{bmatrix} \dfrac{\psi_{\alpha h0} - 0}{T} \\ \dfrac{\psi_{\beta h0} - 0}{T} \end{bmatrix} \qquad \text{Equation 7}$$

The HFI compensation voltage generator 162 also receives the injection voltage $V_h$ 174, the injection frequency $\omega_h$ 172 and the phase offset $\varphi$ 173 and calculates an alpha compensation pulse voltage $V_{\alpha h\_comp}$ 175a and a beta compensation pulse voltage $V_{\beta h\_comp}$ 175b of a compensation pulse voltage 175. The alpha compensation pulse voltage $V_{\alpha h\_comp}$ 175a and the beta compensation pulse voltage $V_{\beta h\_comp}$ 175b are calculated using Equations 2 and 3.

By substituting the initial steady state flux in equation 7 with the predicted initial flux value calculated using equation 5 and equation 4, the final compensation voltage pulse is calculated as:

$$V_{\alpha h\_comp} = \dfrac{V_h \sin\varphi}{\omega_h T} \qquad \text{Equation 8}$$

$$V_{\beta h\_comp} = -\dfrac{V_h \cos\varphi}{\omega_h T} \qquad \text{Equation 9}$$

The HFI angle and speed estimator 118 is enabled by an HFI enable in signal HFI_ENBL_IN 168. The current ISR step HFI_ENBL_IN is named HFI_ENBL_IN$_{NOW}$, while the previous ISR step HFI_ENBL_IN is named HFI_ENBL_IN$_{PREV}$. In response to the HFI enable in signal 168 being asserted, an HFI compensation logic controller 161 generates an HFI enable out signal HFI_ENBL_OUT 169 that enables the HFI injection voltage generator 163 of the HFI 128 and an HFI compensation enable signal HFI_COMP_ENBL 170 that enables the HFI compensation voltage generator 162 of the HFI 128.

If the HFI enable in signal HFI_ENBL_IN 168 is enabled, the HFI enable out signal HFI_ENBL_OUT 169 enables the HFI injection voltage generator 163 to generate the alpha HFI voltage $V_{\alpha h}$ 171a and the beta HFI voltage $V_{\beta h}$ 171b waveforms.

Unfortunately, when the HFI injection voltage generator 163 is transitioned ON or OFF, the addition of the HFI voltage 137 causes a temporary transition disturbance in the control system. The embodiments inject a compensation pulse comprised of the alpha compensation pulse voltage $V_{\alpha h\_comp}$ 175a and the beta compensation pulse voltage $V_{\beta h\_comp}$ 175b during a transition of the alpha HFI voltage $V_{\alpha h}$ 171a and the beta HFI voltage $V_{\beta h}$ 171b waveforms from OFF to ON or from ON to OFF. HFI compensation enable signal HFI_COMP_ENBL 170 enables the HFI compensation voltage generator 162 to generate the compensation pulse voltages 175a-b for the compensation pulse calculated in Equations 8 and 9. The sum of the alpha HFI voltage $V_{\alpha h}$ 171a and the alpha compensation pulse voltage $V_{\alpha h\_comp}$ 175a generates the final HFI injected alpha voltage $V_{\alpha\_HFI}$ 137a. The sum of the beta HFI voltage $V_{\beta h}$ 171b and the beta compensation pulse voltage $V_{\beta h\_comp}$ 175b generates the final HFI injected beta voltage signal $V_{\beta\_HFI}$ 137b.

Figure 2A:
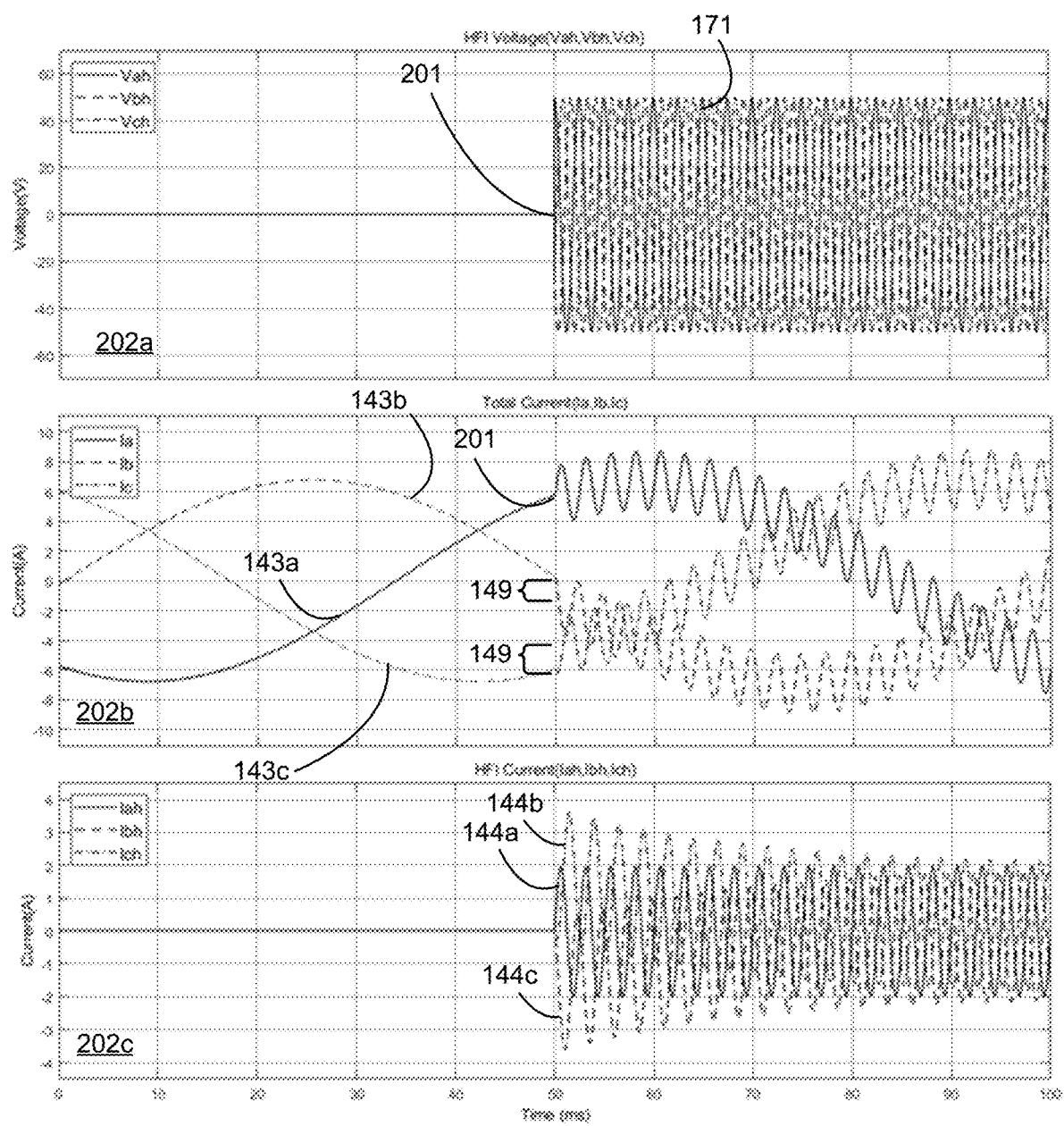
FIG. 2A is graphs of HFI transition from off to on without a compensation voltage pulse voltage according to an embodiment.

FIG. 2A is graphs 202a-c of high frequency injection waveforms. Graph 202a shows the HFI voltage 171 before and after an OFF to ON HFI transition 201. Graph 202b shows the drive output current 143a-c before and after the HFI transition 201. As shown in 202c, there is a delay in the HFI component of the drive current 143a-c settling, causing offsets 149. The delay of settling of HFI current in 202c causes the offset 149 in 202b. The delay causes a disturbance in the accuracy of the motor angle estimate θ 114 and the angular velocity estimate ω 113, and the detected reconstructed stationary reference frame current 131a-b. The embodiments determine the compensation pulse voltages 175 for a compensation pulse that is injected with the HFI voltage 137 into the current regulator voltage output signal 135 to settle the HFI current 144 to a steady state almost instantaneously.

Figure 2B:
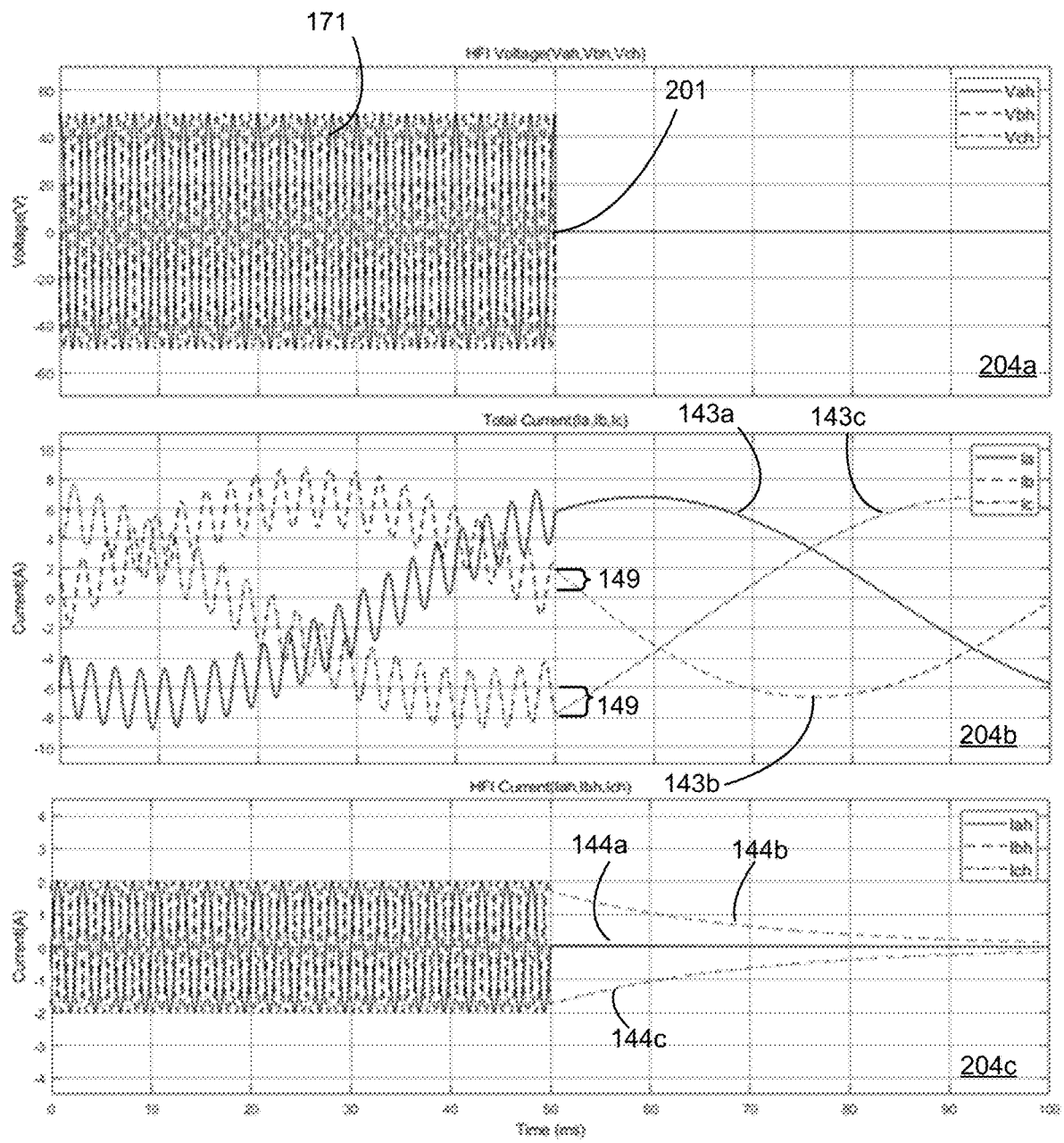
FIG. 2B is graphs of HFI transition from on to off without a compensation voltage pulse voltage according to an embodiment.

FIG. 2B is graphs 204a-c of high frequency injection waveforms. Graph 204a shows the HFI voltage 171 before and after an ON to OFF HFI transition 201. Graph 204b shows the drive output current 143a-c before and after the HFI transition 201. As shown, there is a delay in the HFI component of the drive current 143a-c settling, resulting in offsets 149. The delay of settling of the HFI current in 204c causes the offset 149 in 204b. The delay causes a disturbance in the accuracy of the motor angle estimate θ 114 and the angular velocity estimate ω 113, and the detected reconstructed stationary reference frame current 131a-b.

Figure 3A:
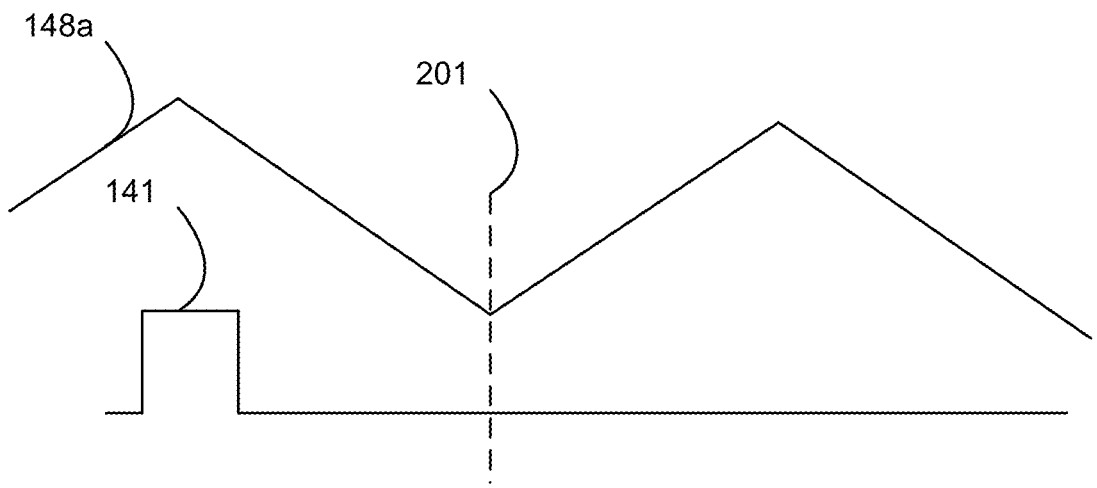
FIG. 3A is a graph of PWM cycles, where compensation pulse is injected before transition occurs, according to an embodiment.
Figure 3B:
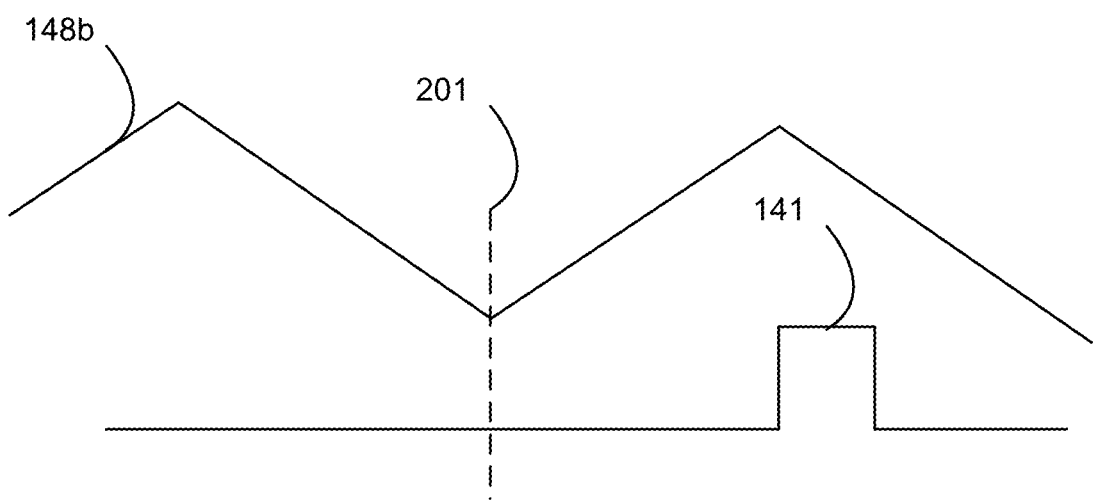
FIG. 3B is a graph of PWM cycles, where compensation pulse is injected after transition occurs, according to an alternate embodiment.

FIG. 3A is a graph of PWM cycles 148 before and after an HFI transition 201. In the depicted embodiment, an HFI compensation pulse 141 with the compensation pulse voltages 175 is generated and summed with the HFI voltage 171 into the current regulator voltage output signal 135 for the PWM cycle 148 before the HFI transition. The pulse 141 can be aligned to the rising period of PWM carrier counter cycle 148a or the falling period of PWM carrier counter cycle 148a, or the middle of the PWM carrier counter cycle 148a FIG. 3B is a graph of PWM cycles 148 before and after an HFI transition 201. In the depicted embodiment, the HFI compensation pulse 141 with the compensation pulse voltages 175 is generated and summed with the HFI voltage 171 into the current regulator voltage output signal 135 for the PWM cycle 148 after the HFI transition 201. The pulse 141 may be aligned to the rising period of PWM carrier counter cycle 148b or the falling period of PWM carrier counter cycle 148b, or the middle of the PWM carrier counter cycle 148b.

Figure 4A:
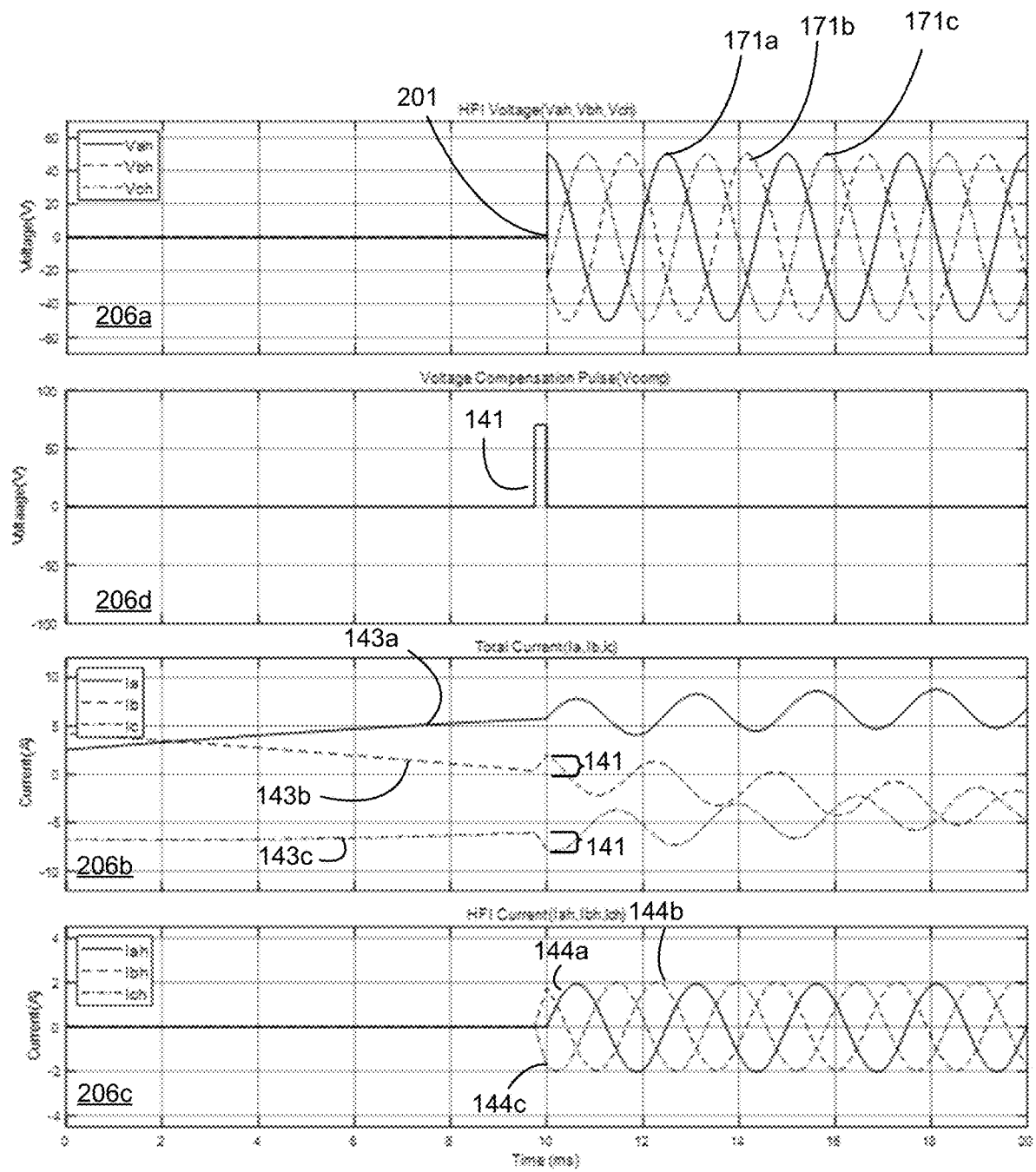
FIG. 4A is graphs of HFI transition from off to on with the proposed compensation voltage pulse scheme, according to an embodiment.

FIG. 4A is graphs 206a-d of high frequency injection waveforms. Graph 206a shows the HFI voltage 171 before and after an OFF to ON HFI transition 201. Graph 206b shows the drive current 143a-c before and after the HFI transition 201. The injection of the HFI compensation pulse 141 of graph 206d mitigates the delays in the HFI component of the drive current 143a-c settling shown in FIG. 2A and mitigates the offsets 149, resulting in the HFI current 144 settling to steady state. The HFI current 144 shown in graph 206c may settle to steady state in less than a machine time constant for the motor 101. The machine time constant may be the inductance for the motor 101 divided by the resistance for the motor 101.

Figure 4B:
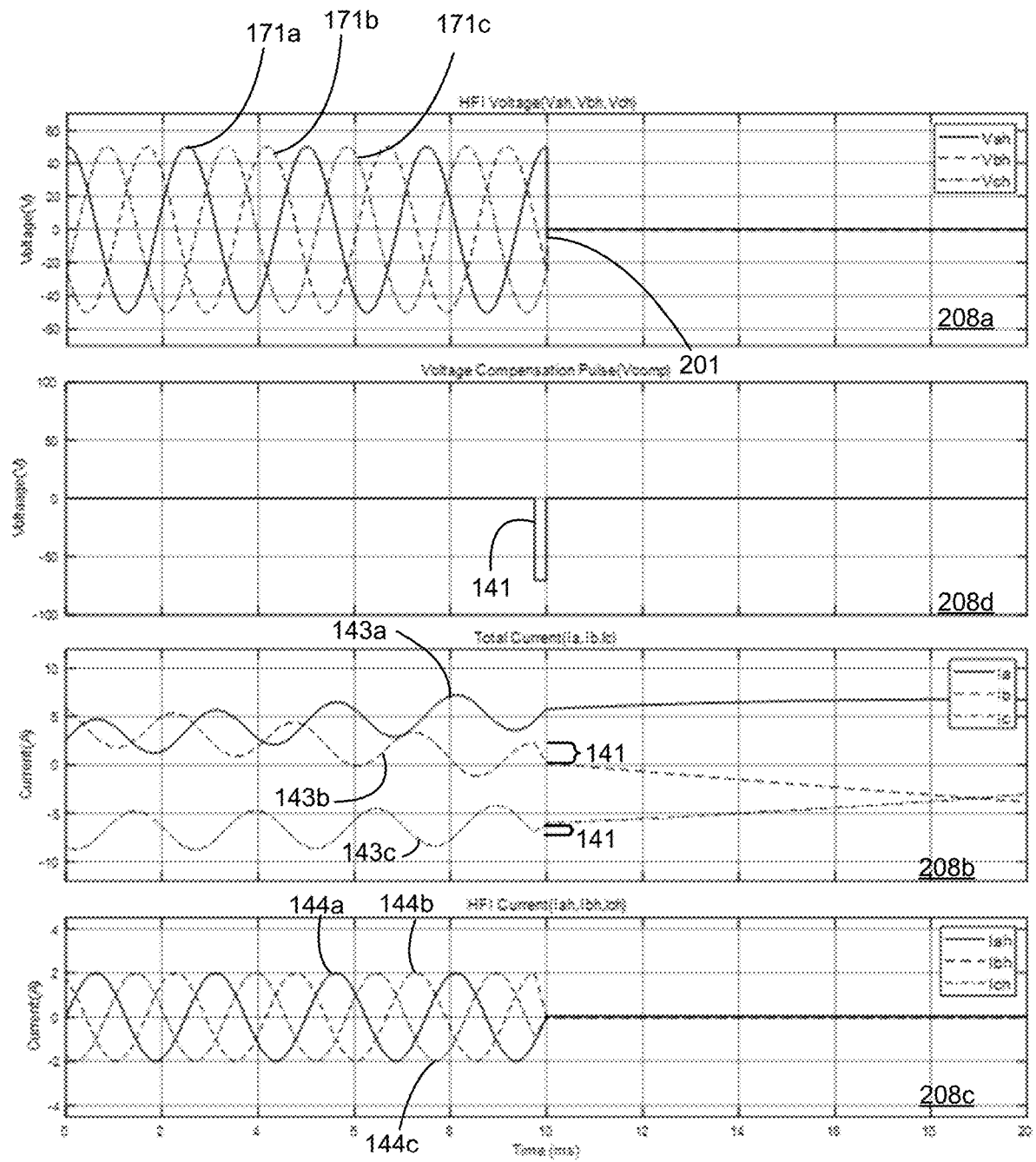
FIG. 4B is graphs of HFI transition from on to off with the proposed compensation voltage pulse scheme, according to an embodiment.

FIG. 4B is graphs 208a-d of high frequency injection waveforms. Graph 208a shows the HFI voltage 171 before and after an ON to OFF HFI transition 201. Graph 208b shows the drive current 143a-c before and after the HFI transition 201. The injection of the HFI compensation pulse 141 of graph 208d mitigates the delays in the HFI component of the drive current 143a-c settling shown in FIG. 2B and mitigates the offsets 149, resulting in the HFI current 144 settling to steady state. The HFI current 144 shown in graph 208c may settle to steady state in less than the machine time constant for the motor 101.

Figure 5A:
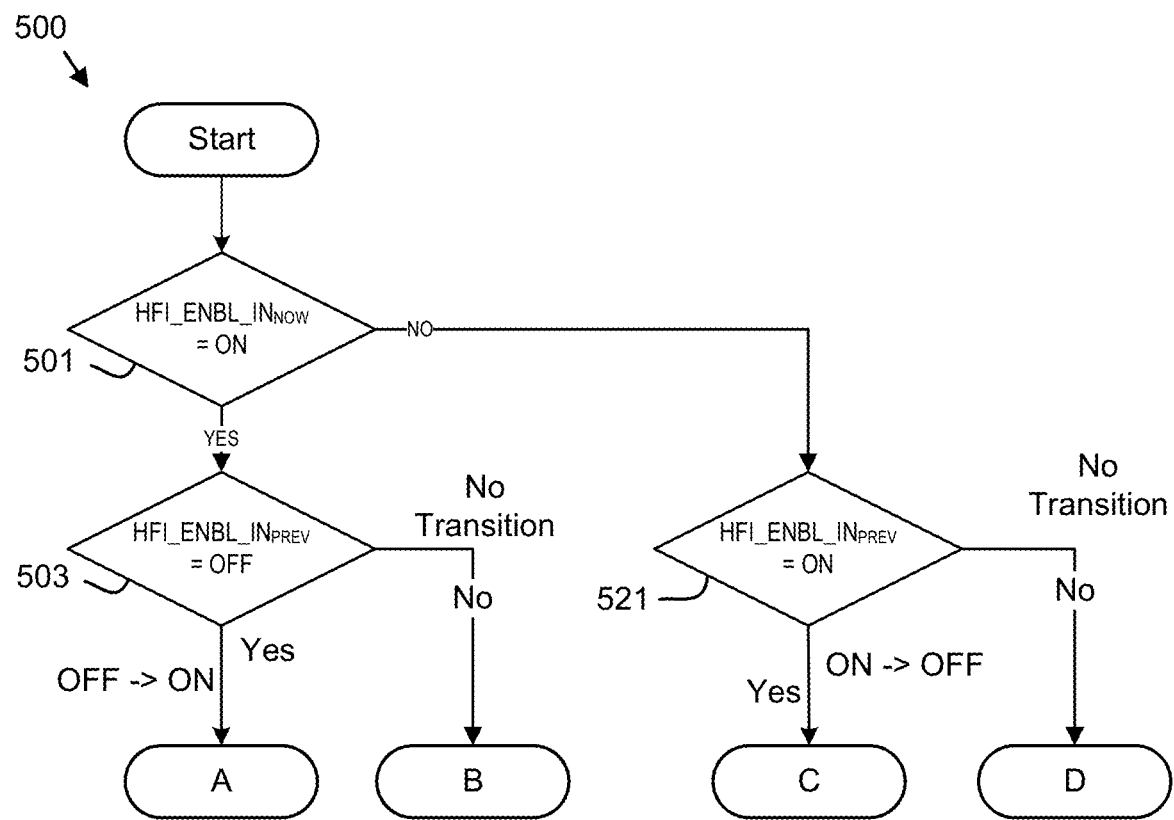
FIG. 5A-C are schematic flow chart diagrams of an HFI transition disturbance elimination method.
Figure 5B:
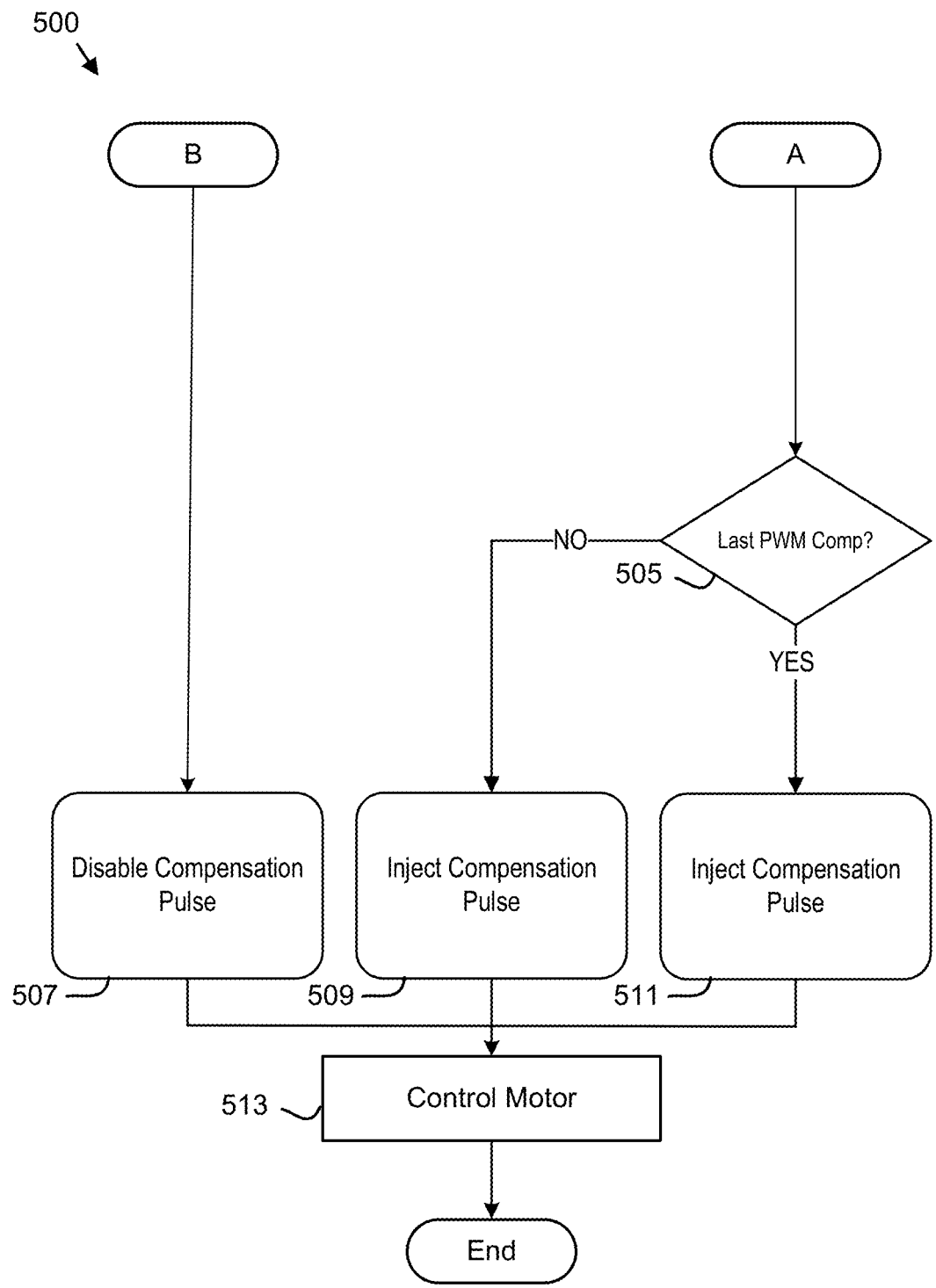
Figure 5C:
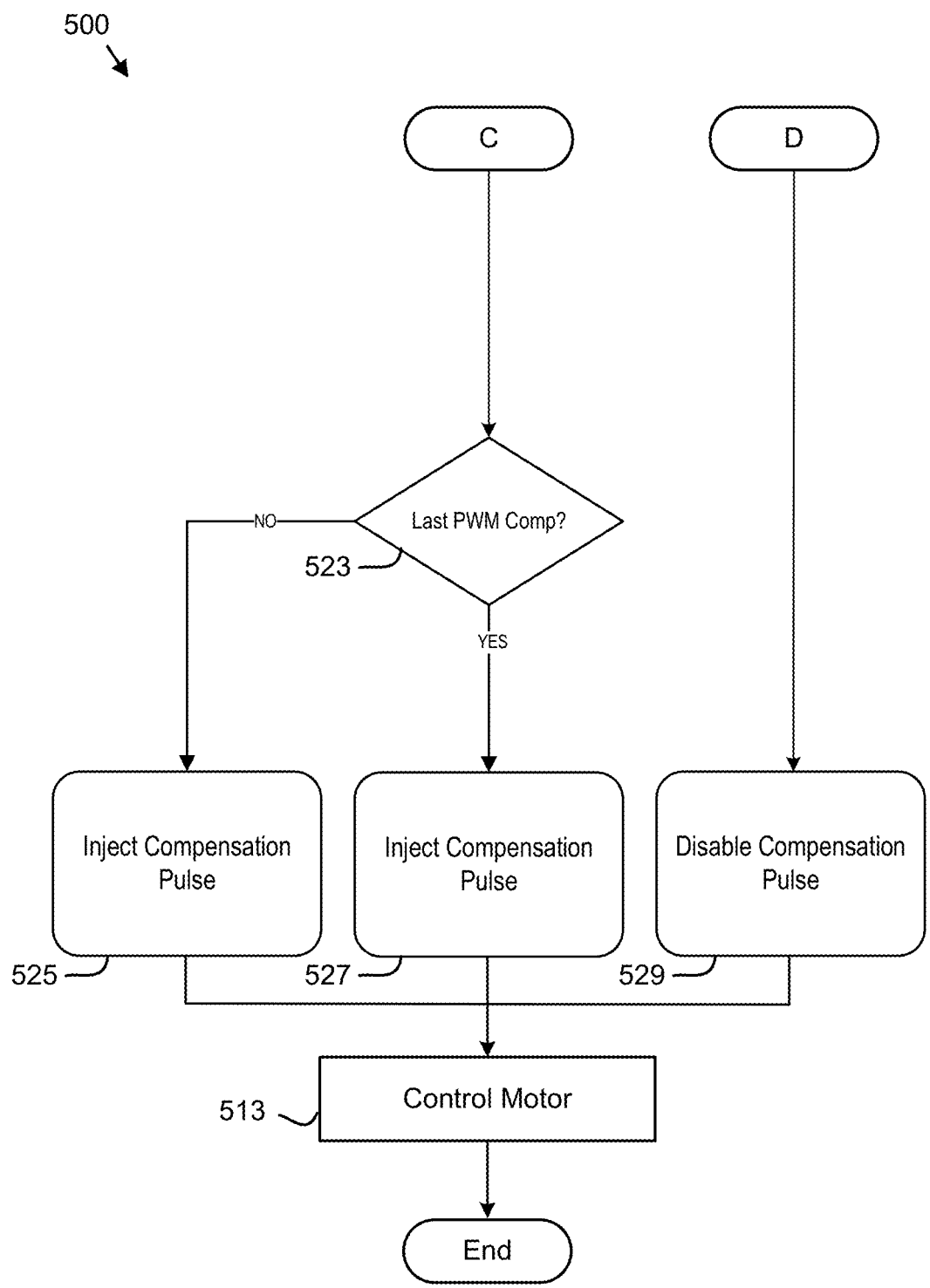

FIG. 5A-C are schematic flow chart diagrams of a high frequency injection transition disturbance elimination method 500. The method 500 determines the compensation pulse voltages 175 and injects the sum of the HFI compensation pulse 141 and HFI voltage 171 into the current regulator voltage output signal 135 for a compensation PWM cycle 148 to settle the HFI current 144. The method 500 may be performed by the processor 405 and/or hardware components. For clarity, the processor 405 is referred to, but hardware components may also perform the functions.

The method 500 starts and the processor 405 determines 501 whether the current value HFI enable in signal HFI_ENBL_IN$_{NOW}$ 168 is ON, indicating the current use of HFI. If the current value HFI enable in signal HFI_ENBL_IN$_{NOW}$ 168 is not ON, the processor 405 determines 521 whether the previous value HFI enable in signal HFI_ENBL_INP$_{REV}$ 168 was ON. If the current value HFI enable in signal HFI_ENBL_IN$_{NOW}$ 168 is not ON and the previous value HFI enable in signal HFI_ENBL_INP$_{REV}$ 168 was ON, there is no HFI transition 201 in path D. The processor 405 may direct no HFI transition. In addition, the processor 405 may detect no HFI transition. The processor 405 may disable 529 the HFI compensation pulse 141. In one embodiment, the processor 405 sets the HFI enable out signal HFI_ENBL_OUT 169 to OFF. The alpha compensation pulse voltage V$_{\alpha h\_comp}$ 175a may be zero. The beta compensation pulse voltage V$_{\beta h\_comp}$ 175b also may be zero.

If the current value HFI enable in signal HFI_ENBL_IN$_{NOW}$ 168 is not ON and the previous value HFI enable in signal HFI_ENBL_INP$_{REV}$ 168 was ON, an HFI On to OFF transition 201 is detected and/or directed. The processor 405 may determine 523 whether the HFI compensation pulse 141 happens before the HFI transition 201 as shown in FIG. 3A or after the HFI 201 as shown in FIG. 3B. If the transition cycle 201 is the last PWM cycle 148a in step 523, the processor 405 determines the compensation pulse voltages 175 for the HFI compensation pulse 141 and injects 527 a sum of the HFI compensation pulse 141 and the HFI voltage 171 into the current regulator voltage output signal 135. The alpha compensation pulse voltage V$_{\alpha h\_comp}$ 175a may be calculated using Equation 8. The beta compensation pulse voltage V$_{\beta h\_comp}$ 175b may be calculated using Equation 9. In one embodiment, the processor 405 sets the HFI enable out signal HFI_ENBL_OUT 169 to OFF.

If the transition cycle 201 is not the last PWM cycle 148a in step 523 as shown in FIG. 3B, the processor 405 determines the compensation pulse voltages 175 for the HFI compensation pulse 141 and injects 525 a sum of the HFI compensation pulse 141 and the HFI voltage 171 into the current regulator voltage output signal 135. The alpha compensation pulse voltage V$_{\alpha h\_comp}$ 175a may be calculated using Equation 2. The beta compensation pulse voltage V$_{\beta h\_comp}$ 175b may be calculated using Equation 3. In one embodiment, the processor 405 sets the HFI enable out signal HFI_ENBL_OUT 169 to ON. The processor 405 may direct the HFI transition. In addition, the processor 405 detect the HFI transition.

If the current value HFI enable in signal HFI_ENBL_IN$_{NOW}$ 168 is ON, the processor 405 determines 503 whether the previous value HFI enable in signal HFI_ENBL_INP$_{REV}$ 168 was OFF. If the current value HFI enable in signal HFI_ENBL_IN$_{NOW}$ 168 is ON and the previous value HFI enable in signal HFI_ENBL_INP$_{REV}$ 168 was not OFF, there is no HFI transition 201 detected in path B. The processor 405 may direct no HFI transition. In addition, the processor 405 may detect no HFI transition. The processor 405 may disable 507 the HFI compensation pulse 141. In one embodiment, the processor 405 sets the HFI enable out signal HFI_ENBL_OUT 169 to ON. The alpha compensation pulse voltage V$_{\alpha h\_comp}$ 175a and the beta compensation pulse voltage V$_{\beta h\_comp}$ 175b may be zero.

If the current value HFI enable in signal HFI_ENBL_IN$_{NOW}$ 168 is ON and the previous value HFI enable in signal HFI_ENBL_INP$_{REV}$ 168 was OFF in step 503, an OFF to ON HFI transition 201 is detected and/or directed. The processor 405 determines 505 whether the transition cycle 201 is a last PWM cycle 148a before the transition cycle 201 as shown in FIG. 3A. If the transition cycle 201 is the last PWM cycle 148a in step 505, the processor 405 determines the compensation pulse voltages 175 for the HFI compensation pulse 141 and injects 511 a sum of the HFI compensation pulse 141 and the HFI voltage 171 into the current regulator voltage output signal 135. The alpha compensation pulse voltage V$_{\alpha h\_comp}$ 175a may be calculated using Equation 2. The beta compensation pulse voltage V$_{\beta h\_comp}$ 175b may be calculated using Equation 3. In one embodiment, the processor 405 sets the HFI enable out signal HFI_ENBL_OUT 169 to OFF.

If the transition cycle 201 is not the last PWM cycle 148a in step 505 as shown in FIG. 3B, the processor 405 determines the compensation pulse voltages 175 for the HFI compensation pulse 141 and injects 509 a sum of the HFI compensation pulse 141 and the HFI voltage 171 into the current regulator voltage output signal 135. The alpha compensation pulse voltage V$_{\alpha h\_comp}$ 175a may be calculated using Equation 2. The beta compensation pulse voltage V$_{\beta h\_comp}$ 175b may be calculated using Equation 3. In one embodiment, the processor 405 sets the HFI enable out signal HFI_ENBL_OUT 169 to ON. The processor 405 may direct the HFI transition. In addition, the processor 405 detect the HFI transition.

The processor 405 may control 513 the motor 101 with or without HFI and the method 500 ends.

Figure 6A:
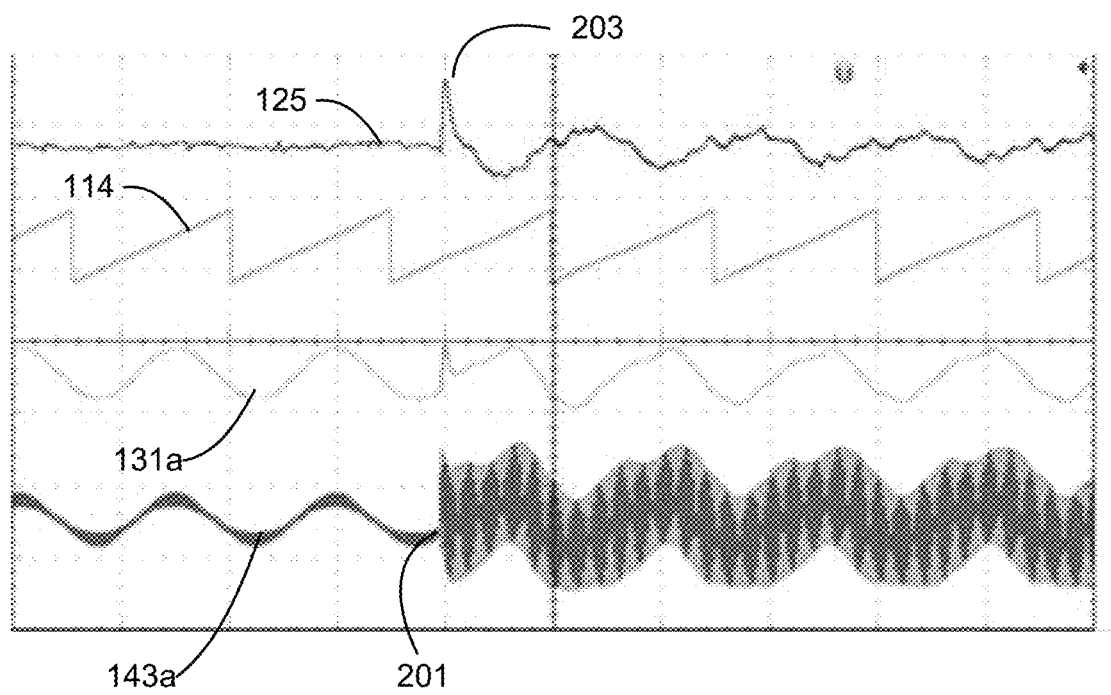
FIG. 6A is experimental waveforms of an off to on HFI transition without compensation scheme according to an embodiment.

FIG. 6A is experimental waveforms of an off to on HFI transition without the HFI compensation pulse 141. A control output voltage 125 a motor angle estimate 114, a reconstructed stationary reference frame alpha-axis current I$_\alpha$ 131a, and a measured drive phase A current 143a are shown. At the HFI transition 201, drive current 143 takes time to settle, reducing the accuracy of the estimated position information 114, resulting in inaccurate control of the motor 101. As a result, there is a glitch 203 in the control output voltage 125.

Figure 6B:
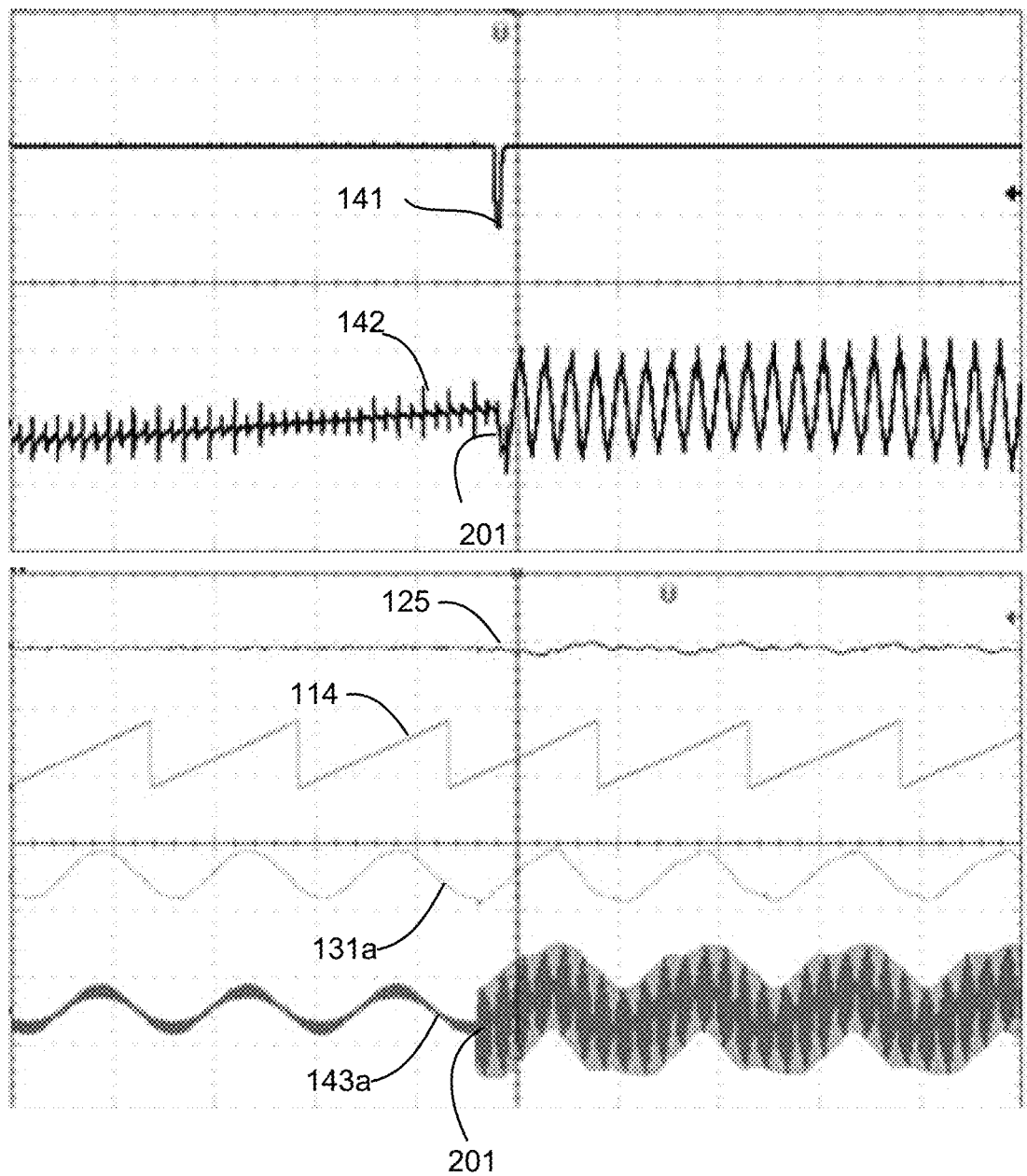
FIG. 6B is experimental waveforms of an off to on HFI transition with compensation scheme according to an embodiment.

FIG. 6B is waveforms of an off to on HFI transition with the HFI compensation pulse 141. A measured current 142, control output voltage V$_d$ 125, motor angle estimate 114, a reconstructed stationary reference frame alpha-axis current I$_\alpha$ 131a, and a measured drive phase A current 143a of FIG. 1B are shown for the off to on HFI transition. The measured current 142 is close up zoom view of the measured drive phase A current 143a about the HFI transition 201. Because of the injection of the HFI compensation pulse 141, the reconstructed stationary reference frame alpha-axis current I$_\alpha$ 131a and the measured drive phase A current 143a settle to a steady state almost instantaneously. As a result, the glitch 203 during the HFI transition 201 is absent.

Figure 6C:
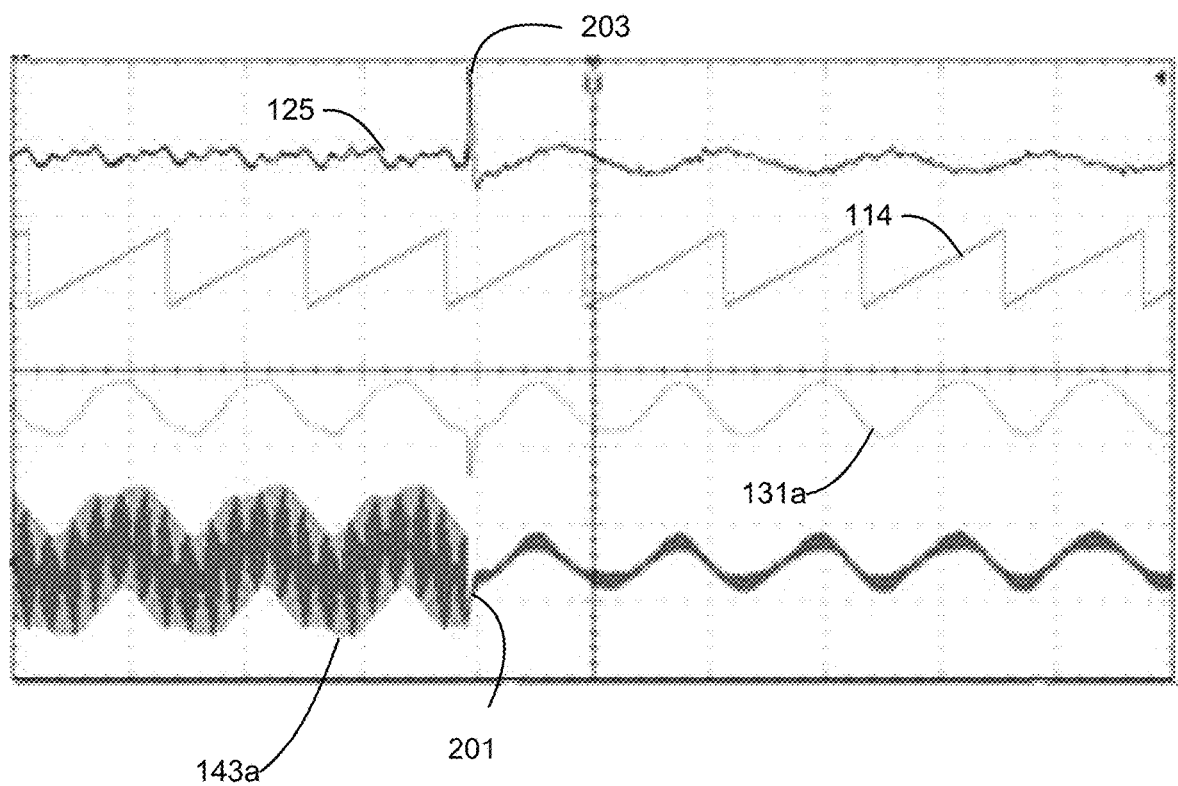
FIG. 6C is experimental waveforms of an on to off HFI transition without compensation scheme according to an embodiment.

FIG. 6C is experimental waveforms of an on to off HFI transition without the HFI compensation pulse 141. A control output voltage 125, a motor angle estimate 114, a reconstructed stationary reference frame alpha-axis current I$_\alpha$ 131a, and a measured drive phase A current 143a are shown. At the HFI transition 201, drive current 143 takes time to settle, reducing the accuracy of the estimated position information 114, resulting in inaccurate control of the motor 101. As a result, there is a glitch 203 in the control output voltage 125.

Figure 6D:
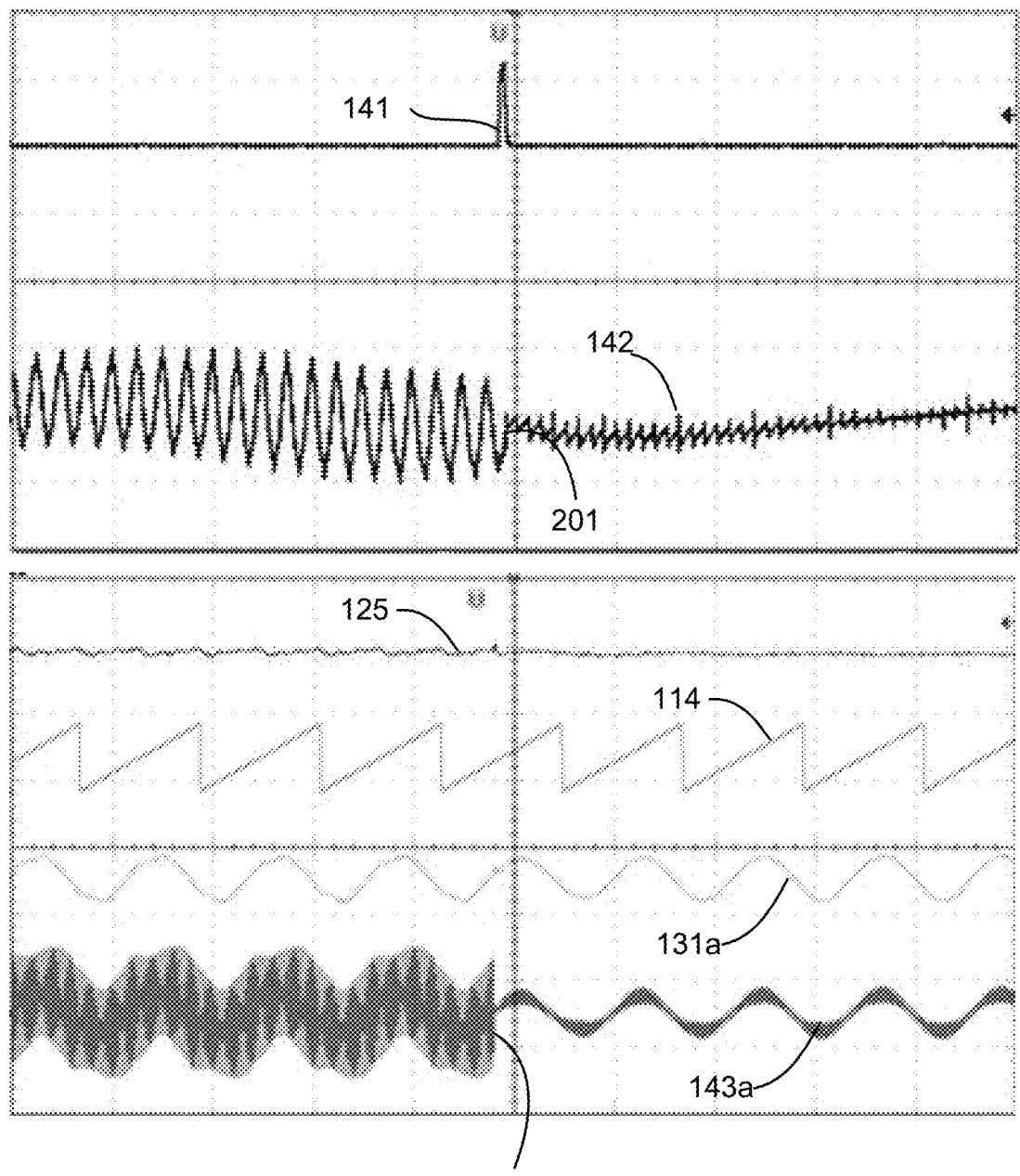
FIG. 6D is experimental waveforms of an on to off HFI transition with compensation scheme according to an embodiment.

FIG. 6D is waveforms of an on to off HFI transition with the HFI compensation pulse 141. The measured current 142, drive current 143, control output voltage $V_d$ 125, motor angle estimate 114, a reconstructed stationary reference frame alpha-axis current $I_\alpha$ 131, and a measured drive phase A current 143a of FIG. 1B are shown for the on to off HFI transition. Because of the injection of the HFI compensation pulse 141, the reconstructed stationary reference frame alpha-axis current $I_\alpha$ 131a, and the drive phase A current 143a settle to steady state almost instantaneously. As a result, the glitch 203 during the HFI transition 201 is absent.

Problem/Solution

A motor system 100 may employ HFI to eliminate the cost of a position sensor for determining the position of the rotor 105 in the motor 101. The HFI alpha-axis current $I_{\alpha h}$ 176a and the HFI beta-axis current $I_{\beta h}$ 176b includes the position information of the HFI voltage 171 from which the angular velocity estimate ω 113 and the motor angle estimate 114 are determined. However, during an HFI transition 201 from OFF to ON or ON to OFF, the drive current 143 in FIG. 2 takes time to stabilize, reducing the accuracy of the estimated position information 114 and reconstructed stationary reference frame alpha-axis current 131, thus injecting disturbance into current regulator 110 in FIG. 1B.

The embodiments detect the HFI transition 201 of the HFI voltage 171 for the motor 101 and determine the compensation pulse voltages 175a-b for the HFI compensation pulse 141. The embodiments further inject a sum of the HFI compensation pulse 141 and the HFI voltage 171 into the current regulator voltage output signal 135 for a compensation PWM cycle 148. The HFI compensation pulse 141 settles the HFI current 144 to a steady state almost instantaneously. As a result, the efficacy of the position determination using HFI is enhanced.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
   a processor;
   a memory storing code executable by the processor to perform:
   directing a High Frequency Injection (HFI) transition for a motor;
   determining compensation pulse voltages for an HFI compensation pulse;
   injecting a sum of the HFI compensation pulse and an HFI voltage into a current regulator voltage output signal for a compensation Pulse Width Modulation (PWM) cycle, wherein the compensation PWM consists of a last PWM cycle before the HFI transition or a first PWM cycle after the HFI transition and the HFI compensation pulse settles an HFI current to a steady state.

2. The apparatus of claim 1, the processor further controlling the motor with the current regulator voltage output signal.

3. The apparatus of claim 1, wherein the HFI voltage is selected from the group consisting of pulse voltage injection, rotating voltage injection, and square wave voltage injection.

4. The apparatus of claim 1, wherein the HFI current settles to the steady state in less than 10 percent a machine time constant for the motor.

5. The apparatus of claim 1, wherein the HFI voltage is a sinusoidal signal and the compensation pulse voltages are determined as $$V_{\alpha h\_comp} = \frac{V_h \sin\varphi}{\omega_h T}$$

and $$V_{\beta h\_comp} = -\frac{V_h \cos\varphi}{\omega_h T},$$

wherein $V_h$ is an HFI reference voltage, $\omega_h$ is an HFI voltage frequency, T is a time period to settle the HFI current to the steady state, and φ is a phase offset.

6. The apparatus of claim 1, wherein the HFI voltage is a sinusoidal signal and the compensation pulse voltages are determined as a function of an HFI reference voltage, an HFI voltage frequency, and a phase offset.

7. A method comprising:
   directing, by use of a processor, a High Frequency Injection (HFI) transition for a motor;
   determining compensation pulse voltages for an HFI compensation pulse;
   injecting a sum of the HFI compensation pulse and an HFI voltage into a current regulator voltage output signal for a compensation Pulse Width Modulation (PWM) cycle, wherein the compensation PWM consists of a last PWM cycle before the HFI transition or a first PWM cycle after the HFI transition and the HFI compensation pulse settles an HFI current to a steady state.

8. The method of claim 7, the method further comprising controlling the motor with the current regulator voltage output signal.

9. The method of claim 7, wherein the HFI voltage is selected from the group consisting of pulse voltage injection, rotating voltage injection, and square wave voltage injection.

10. The method of claim 7, wherein the HFI current settles to the steady state in less than 10 percent of a machine time constant for the motor.

11. The method of claim 7, wherein the HFI voltage is a sinusoidal signal and the compensation pulse voltages are determined as $$V_{\alpha h\_comp} = \frac{V_h \sin\varphi}{\omega_h T}$$

and $$V_{\beta h\_comp} = -\frac{V_h \cos\varphi}{\omega_h T},$$

wherein $V_h$ is an HFI reference voltage, $\omega_h$ is an HFI voltage frequency, T is a time period to settle the HFI current to the steady state, and φ is a phase offset.

12. The method of claim 7, wherein the HFI voltage is a sinusoidal signal and the compensation pulse voltages are determined as a function of an HFI reference voltage, an HFI voltage frequency, and a phase offset.

13. A computer program product, the computer program product comprising a non-transitory computer readable storage medium having program code embodied therein, the program code readable/executable by a processor to:
  directing a High Frequency Injection (HFI) transition for a motor;
  determining compensation pulse voltages for an HFI compensation pulse;
  injecting a sum of the HFI compensation pulse and an HFI voltage into a current regulator voltage output signal for a compensation Pulse Width Modulation (PWM) cycle, wherein the compensation PWM consists of a last PWM cycle before the HFI transition or a first PWM cycle after the HFI transition and the HFI compensation pulse settles an HFI current to a steady state.

14. The computer program product of claim 13, the processor further controlling the motor with the current regulator voltage output signal.

15. The computer program product of claim 13, wherein the HFI voltage is selected from the group consisting of pulse voltage injection, rotating voltage injection, and square wave voltage injection.

16. The computer program product of claim 13, wherein the HFI current settles to the steady state in less than 10 percent of a machine time constant for the motor.

17. The computer program product of claim 13, wherein the HFI voltage is a sinusoidal signal and the compensation pulse voltages are determined as a function of an HFI reference voltage, an HFI voltage frequency, and a phase offset.

18. The computer program product of claim 13, wherein the HFI voltage is a sinusoidal signal and the compensation pulse voltages are determined as $$V_{\alpha h\_comp} = \frac{V_h \sin\varphi}{\omega_h T}$$

and $$V_{\beta h\_comp} = -\frac{V_h \cos\varphi}{\omega_h T},$$

wherein $V_h$ is an HFI reference voltage, $\omega_h$ is an HFI voltage frequency, T is a time period to settle the HFI current to the steady state, and $\varphi$ is a phase offset.

* * * * *